United States Patent
Joisha (10) Patent No.: US 9,465,594 B2
(45) Date of Patent: Oct. 11, 2016

(54) DISTRIBUTED IMPLEMENTATION OF SEQUENTIAL CODE THAT INCLUDES A FUTURE

(71) Applicant: HEWLETT-PACKARD DEVELOPMENT COMPANY, L.P., Houston, TX (US)

(72) Inventor: Pramod G. Joisha, Cupertino, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 685 days.

(21) Appl. No.: 13/778,890

(22) Filed: Feb. 27, 2013

(65) Prior Publication Data

US 2014/0245260 A1 Aug. 28, 2014

(51) Int. Cl.
G06F 9/44 (2006.01)
G06F 9/45 (2006.01)

(52) U.S. Cl.
CPC .................................. G06F 8/456 (2013.01)

(58) Field of Classification Search
None
See application file for complete search history.

(56) References Cited

U.S. PATENT DOCUMENTS

| | | | | |
|---|---|---|---|---|
| 5,043,873 | A * | 8/1991 | Muramatsu et al. | 711/119 |
| 6,286,130 | B1 * | 9/2001 | Poulsen et al. | 717/119 |
| 7,703,077 | B2 | 4/2010 | Rehof | |
| 7,712,080 | B2 | 5/2010 | Pan | |
| 8,239,847 | B2 | 8/2012 | Yu | |
| 8,423,750 | B2 * | 4/2013 | Hall | G06F 9/3009 712/220 |
| 2007/0079288 | A1 * | 4/2007 | Willwerth et al. | 717/124 |
| 2009/0031290 | A1 * | 1/2009 | Feng et al. | 717/126 |
| 2009/0055630 | A1 * | 2/2009 | Isshiki et al. | 712/216 |
| 2012/0159459 | A1 * | 6/2012 | Turner et al. | 717/138 |

OTHER PUBLICATIONS

Katz et al, "Continuing Into the Future: On the Interaction of Futures and First-Class Continuations," 1990, ACM.*
Wang et al, "Code Generation and Optimization for Transactional Memory Constructs in an Unmanaged Language," IEEE, 2007.*
Tabatabai et al., Compiler and Runtime Support for Efficient SoftwareTransactional Memory, Jun. 10-16, 2006 (12 pages).
Berger et al., Grace: Safe Multithreaded Programming for C/C++, OOPSLA 2009, Oct. 25-29, 2009 (16 pages).
Bocchino, Jr. et al., Parallel Programming Must Be Deterministic by Default, Mar. 2009 (6 pages).
Cytron et al., Efficiently Computing Static Single Assignment Form and the Control Dependence Graph, Mar. 7, 1991 (52 pages).
Davis, Matt, Linux Journal (www.linuxjournal.com) Creating a vDSO: the Colonels Other Chicken, Feb. 6, 2012 (4 pages).
Ding et al., Software Behavior Oriented Parallelization, Jun. 11-13, 2007 (12 pages).

(Continued)

*Primary Examiner* — Lewis A Bullock, Jr.
*Assistant Examiner* — Christine Dang
(74) *Attorney, Agent, or Firm* — Trop, Pruner & Hu, P.C.

(57) ABSTRACT

A distributed code including a plurality of programs is created based on a sequential code that includes at least one call of a first function associated with a future, where at least a first of the plurality of programs is to execute the first function associated with the future, and at least a second of the plurality of programs is to execute a second function in a present section of the sequential code. A normalization function is included in each of the plurality of programs to normalize virtual addresses accessed by the first and second functions.

16 Claims, 7 Drawing Sheets

(56) References Cited

OTHER PUBLICATIONS

Chen Ding, Access Annotation for Safe Speculative Parallelization: Semantics and Support, Technical Report TR-966, Mar. 2011 (22 pages).
Harris et al., Optimizing Memory Transactions, PLDI 2006, Jun. 11-14, 2006 (12 pages).
Liskov et al., Promises: Linguistic Support for Efficient Asynchronous Procedure Calls in Distributed Systems, Proceedings of the SIGPLAN 2008, Conference on Programming (8 pages).
Chuanle Ke et al., Safe Parallel Programming using Dynamic Dependence Hints, OOPSLA 2011, Oct. 22-27, 2011 (16 pages).
Yang Ni et al., Design and Implementation of Transactional Constructs for C/C++, OOPSLA 2008, Oct. 19-23, 2008 (17 pages).
Patrick G. Sobalvarro, A Lifetime-based Garbage Collector for LISP Systems on General-Purpose Computers, Department of Electrical Engineering and Computer Science, MIT, Sep. 1988 (68 pages).
Adam Welc et al., Safe Futures for Java, OOPSLA 2005, Oct. 16-20, 2005 (15 pages).
Henry G. Baker et al., The Incremental Garbage Collection of Processes, MIT—Artificial Intelligence Laboratory, Dec. 1977 (12 pages).
Bocchino, Jr. et al., Software Transactional Memory for Large Scale Clusters, Feb. 20-23, 2008 (11 pages).
Burckhardt et al., Concurrent Programming with Revisions and Isolation Types, Oct. 17-21, 2010 (17 pages).
Bykov et al., Orleans: Cloud Computing for Everyone, Oct. 27-28, 2011 (14 pages).
Byung-Gon Chun et al., CloneCloud: Elastic Execution between Mobile Device and Cloud, Apr. 10-13, 2011 (14 pages).
Albert Cohen et al., Programming Parallelism with Futures in Lustre, Oct. 7-12, 2012 (10 pages).
Eduardo Cuervo et al., MAUI: Making Smartphones Last Longer with Code Offload, Jun. 15-18, 2010 (14 pages).
Cormac Flanagan et al., The Semantics of Future and Its Use in Program Optimization, Jan. 23-25, 1995 (12 pages).
Mark S. Gordon et al., COMET: Code Offload by Migrating Execution Transparently, Oct. 19, 2012 (14 pages).
Robert H. Halstead, Jr., MIT, Multilisp: A Language for Concurrent Symbolic Computation, Oct. 1985 (38 pages).
Bryan Jacobs et al., Distributive Program Parallelization Using a Suggestion Language, Dec. 2009 (30 pages).
Chuanle Ke et al., Safe Parallel Programming using Dynamic Dependence Hints, Oct. 22-27, 2011 (16 pages).
Kirk Kelsey et al., Fast Track: A Software System for Speculative Program Optimization, Technical Report TR-2006-907, Nov. 2008 (18 pages).
Hanjun Kim et al., Automatic Speculative DOALL for Clusters, Mar. 29, 2012 (10 pages).
Hanjun Kim et al., Scalable Speculative Parallelization on Commodity Clusters, Dec. 30, 2010 (12 pages).
Michael Litzkow et al., Checkpoint and Migration of UNIX Processes in the Condor Distributed Processing System, Technical Report, Apr. 1997 (9 pages).
Alan Messer et al., Towards a Distributed Platform for Resource-Constrained Devices, Jul. 2002 (15 pages).
Luc Moreau, Sound Evaluation of Parallel Functional Programs with First-Class Continuations, 1994 (394 pages).
Armand Navabi et al., Quasi-Static Scheduling for Safe Futures, Feb. 20-23, 2008 (10 pages).
Polyvios Pratikakis et al., Transparent Proxies for Java Futures, Oct. 2004 (47 pages).
Arun Raman et al., Speculative Parallelization Using Software Multi-threaded Transactions, Mar. 13-17, 2010 (12 pages).
Hovav Shacham et al., On the Effectiveness of AddressSpace Randomization, Oct. 25-29, 2004 (10 pages).
Chen Tian et al., Supporting Speculative Parallelization in the Presence of Dynamic Data Structures, Jun. 2010 (12 pages).
Chen Tian et al., Copy or Discard Execution Model for Speculative Parallelization on Multicores, Nov. 2008 (12 pages).
Chatterjee, Arunodaya, Futures: A Mechanism for Concurrency Among Objects, 1989 (6 pages).
Navabi et al., Science of Computer Programming, Dependence analysis for safe futures, Jun. 2012 (20 pages).
Friedman et al., The Impact of Applicative Programming on Multiprocessing, 1976, pp. 263-272.
Peter Hibbard, Parallel Processing Facilities, Department of Computer Science, Carnegie-Mellon University, Pittsburgh, 1976 (8 pages).
P. Nienaltowski et al., Concurrent object-oriented programming on .NET, Oct. 2003 (7 pages).
Peter Luksch, Software Engineering Methods for Designing Parallel and Distributed Applications from Sequential Programs in Scientific Computing, Jan. 7-10, 1997 (10 pages).
Schaeffer et al., The Enterprise Model for Developing Distributed Applications, 1992 (24 pages).

\* cited by examiner

$P_f$ f.1  tf := ff'ₛ(...)
f.2  W := W ∪ {&tf}
f.3  $w_f$ := norm($\sigma_f$, W)
f.4  send($w_f$)
f.5  $\overline{\text{recv}}$(&$r_p$)
f.6  $\overline{\text{recv}}$(&$w_p$)
f.7  if $w_f \cap r_p = \emptyset$
      ∧($c = 0 \vee w_f \cap w_p = \emptyset$)
f.8    sendc($w_f - w_p$)
f.9    $\overline{\text{recvc}}$($w_p$)
f.10 else
f.11   sendc($w_f \cup w_p$)
f.12   tp := fpₛ(...)
f.13 endif $P_p$ p.1  tp := fp'ₛ(...)
p.2  W := W ∪ {&tp}
p.3  $r_p$ := norm($\sigma_p$, R)
p.4  $w_p$ := norm($\sigma_p$, W)
p.5  send($r_p$)
p.6  send($w_p$)
p.7  $\overline{\text{recv}}$(&$w_f$)
p.8  if $w_f \cap r_p = \emptyset$
      ∧($c = 0 \vee w_f \cap w_p = \emptyset$)
p.9    sendc($w_p$)
p.10   $\overline{\text{recvc}}$($w_f \cup w_p$)
p.11 else
p.12   $\overline{\text{recvc}}$($w_f \cup w_p$)
p.13   tp := fpₛ(...)
p.14 endif

```
function ffₛ(...):          function ff'ₛ(...):
...                         ...
...X...                     rb(&X)
Y := ...                    ...X...
ffaₛ(...)                   wb(&Y)
Z[i] := ...                 Y := ...
                            ffa'ₛ(...)
                            wb(&Z[i])
                            Z[i] := ...
```

FIG. 6

```
#include <stdio.h>
include <stdlib.h> int X;

int main ()
{
   X = rand ();
   printf ("&X = %p; X = %d\n", &X, X);
   return 0;
}
```

f.31 $tf := ff'_s(\ldots)$
f.32 $W := W \cup \{\&tf\}$
f.33 $w_f := \text{norm}(\sigma_f, W)$
f.34 $\text{send}(w_f)$
f.35 $\overline{\text{recv}}(\&w_p)$
f.36 $\text{sendc}(w_f - w_p)$
f.37 $\overline{\text{recv}}(\&r_p)$
f.38 if $w_f \cap r_p = \emptyset \wedge (c = 0$
      $\vee w_f \cap w_p = \emptyset)$
f.39   $\overline{\text{recvc}}(w_p)$
f.40 else
f.41   $\text{sendc}(w_p)$
f.42   $\text{discardc}(|w_p|)$
f.43   $tp := fp_s(\ldots)$
f.44 endif

$$P_p$$

p.31 $tp := fp'_s(\ldots)$
p.32 $W := W \cup \{\&tp\}$
p.33 $r_p := \text{norm}(\sigma_p, R)$
p.34 $w_p := \text{norm}(\sigma_p, W)$
p.35 $\text{send}(w_p)$
p.36 $\text{send}(r_p)$
p.37 $\text{sendc}(w_p)$
p.38 $\overline{\text{recv}}(\&w_f)$
p.39 if $w_f \cap r_p = \emptyset \wedge (c = 0$
      $\vee w_f \cap w_p = \emptyset)$
p.40   $\overline{\text{recvc}}(w_f - w_p)$
p.41 else
p.42   $\overline{\text{recvc}}(w_f - w_p)$
p.43   $\overline{\text{recvc}}(w_p)$
p.44   $tp := fp_s(\ldots)$
p.45 endif

FIG. 8

$P_f$ f.61 $hf_1 := \text{recv}(\&w_p)$
f.62 $hf_2 := \text{recv}(\&r_p)$
f.63 $tf := ff'_s(\ldots)$
f.64 $W := W \cup \{\&tf\}$
f.65 $w_f := \text{norm}(\sigma_f, W)$
f.66 $\text{send}(w_f)$
f.67 $\text{wait}(hf_1)$
f.68 $\text{sendc}(w_f - w_p)$
f.69 $\text{wait}(hf_2)$
f.70 if $w_f \cap r_p = \emptyset \wedge (c = 0$
    $\vee w_f \cap w_p = \emptyset)$
f.71 $\overline{\text{recvc}(w_p)}$
f.72 else
f.73 $\overline{\text{sendc}(w_p)}$
f.74 $\overline{\text{discardc}(|w_p|)}$
f.75 $tp := fp_s(\ldots)$
f.76 endif

$P_p$ p.61 $hp_1 := \text{recv}(\&w_f)$
p.62 $tp := fp'_s(\ldots)$
p.63 $W := W \cup \{\&tp\}$
p.64 $r_p := \text{norm}(\sigma_p, R)$
p.65 $w_p := \text{norm}(\sigma_p, W)$
p.66 $\text{send}(w_p)$
p.67 $\text{send}(r_p)$
p.68 $\text{sendc}(w_p)$
p.69 $\text{wait}(hp_1)$
p.70 $hp_2 := \text{recvc}(w_f - w_p)$
p.71 if $w_f \cap r_p = \emptyset \wedge (c = 0$
    $\vee w_f \cap w_p = \emptyset)$
p.72 $\text{wait}(hp_2)$
p.73 else
p.74 $\overline{\text{recvc}(w_p)}$
p.75 $\text{wait}(hp_2)$
p.76 $tp := fp_s(\ldots)$
p.77 endif

DISTRIBUTED IMPLEMENTATION OF SEQUENTIAL CODE THAT INCLUDES A FUTURE

BACKGROUND

For improved performance, code can be executed in a distributed fashion in a parallel computing system that has multiple processing nodes. Distributed processing can include dividing processing tasks into multiple partitions that can be concurrently executed by the multiple processing nodes.

In some cases, a specialized framework, library or programming language can be used to implement a distributed processing system. Examples include the MapReduce framework, the MPI (Message Passing Interface) Library, and the Erlang programming language. However, using such specialized frameworks, libraries, and languages involves understanding parallel programming concepts that can be relatively complex.

BRIEF DESCRIPTION OF THE DRAWINGS

Some embodiments are described with respect to the following figures.

DETAILED DESCRIPTION

A simpler way of producing distributed code for running in a distributed computing environment involves generating the distributed code from sequential code. Sequential code refers to code (which includes a collection of executable instructions) that is arranged to execute sequentially. A future construct (also referred to simply as a "future") can be included in the sequential code to allow for generation of the distributed code. A future can refer to a placeholder for a value that will eventually exist. This value can come into existence at any time, so long as the value is available before its implicit or explicit use.

Figure 1:
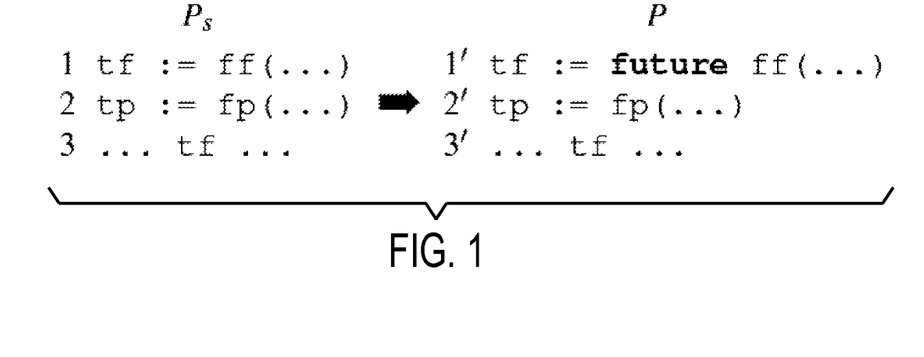
FIGS. 1 and 2 illustrate example sequential codes that can be converted to distributed code in accordance with some implementations.

An example original sequential code, $P_s$, is depicted in FIG. 1. The example original sequential code, $P_s$, has three lines of code. In line 1, a variable tf is set equal to the output of a function ff. In line 2, a variable tp is set equal to the output of a function fp. In line 3, the value of the variable tf is used. A function can refer to a routine or any other code that can perform a specified task.

The program P depicted in FIG. 1 is a futurized instance of the original sequential code $P_s$. In the futurized instance P, lines 1'-3' correspond to lines 1-3 of the sequential code $P_s$. However, at line 1' of the futurized instance P, a call of ff is prefixed with the future keyword to convert the call to a future call. The normal call is referred to as the future call's synchronous counterpart. The future call immediately returns with a future. This future is assignable to a variable, such as to tf at line 1' in FIG. 1. The future is said to be claimed at the point at which its value is used, such as at line 3' in FIG. 1.

The code stretch from just after the future's assignment to just before its claim point is referred to as the present section—for example, the code from just after line 1' to just before line 3' is the present section in the example of FIG. 1. The present section of a code includes one or more functions that are invoked after the future call and prior to claiming the future. As discussed further below, the function that is the subject of the future call and the function(s) in the present section can be executed concurrently—the ability to separately identify the future call and the present section forms the basis for generating distributed code based on sequential code, in accordance with some implementations.

The future call is said to complete when its synchronous counterpart has fully executed. At run time, the code is free to complete the future call anywhere between the point the future call is initiated (invocation point) and the claim point. In accordance with some implementations, a parallel programming model (PPM) is provided in which a future call's synchronous counterpart starts executing concurrently with the present section. If a potential breach of sequential semantics, called a violation, is detected, then all effects due to the parallel execution are discarded and the lines of the sequential code are executed again, this time sequentially in accordance with $P_s$. In this manner, the distributed implementation of the sequential code achieves a safe future, since the semantics of the original sequential program are preserved.

The sequential program can be written in an unmanaged language, such as C or C++. An unmanaged language does not employ entities such as virtual machines or the like to ensure address consistency or to perform sequential semantics checks. Examples of managed languages include Java and C#.

Figure 2:
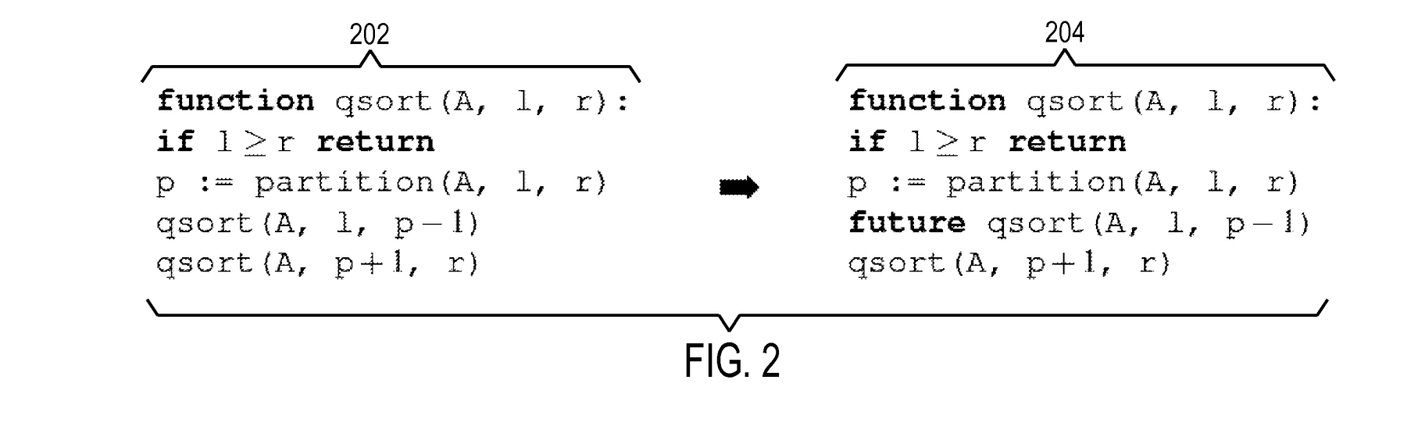

FIG. 2 shows an example futurized Quicksort program. In FIG. 2, the original sequential Quicksort program is represented as 202, while its futurized instance is represented as 204. In the futurized Quicksort program, the future keyword is added to the call of a qsort function. In FIG. 2, unlike in FIG. 1, the future call (in this case a call of the qsort function) is not implicitly or explicitly used (as is the case at line 3' in FIG. 1). If a future's value is not implicitly or explicitly used, as in FIG. 2, the future is considered to be claimed at the end of the current lexical scope. A scope can refer to a context within a program in which a variable is valid and can be used. The lexical scope specifies that the name of a variable does not exist outside the text of a function to which that variable is bound.

Generating distributed code from sequential code can be associated with various challenges. In accordance with some implementations, relatively efficient techniques or mechanisms are provided to produce distributed code from sequential code. In accordance with some implementations, the distributed code generated from sequential code can include multiple programs that can be executed on respective different processing machines. A "processing machine" can refer to a computer system, a processor, a core of a processor, or any other processing circuit that is able to execute program code.

The multiple programs of the distributed code include a first program that is to execute a first function associated with a future call, and a second program that is to execute a second function in a present section of the sequential code. The ability to execute the first and second programs on different processing machines allows for parallel execution of the first and second functions that can result in improved performance as compared to execution of the sequential code in a sequential manner.

Techniques or mechanisms according to some implementations allow for non-disruptive use of sequential code in producing the respective distributed code. The sequential code can be written in standard programming languages such as C, C++, or other languages. Non-disruptive use of sequential code refers to use in which no data structure changes have to be made to the source code of the sequential code. Instead, relatively minor syntactic changes can be made to a control structure of the sequential code.

A future according to some implementations can decouple a logical behavior of the future from a performance behavior of the future. Sequential semantics (i.e. semantics of the sequential code) are used to determine the logical behavior, and a PPM is used to determine the performance behavior. From a programmer's point of view, all reasoning is as if all mentions of a future in the code were elided (removed) and the code were executed sequentially. The only impact of a future is on the program's performance during execution.

In the ensuing discussion, any function symbol in $P_s$'s source code (the original sequential source code) is referred to with the subscript s. Any function symbol in P's source code (a futurized instance of the sequential source code) is referred to as is. Thus, $ff_s$ and $fp_s$ in $P_s$ are the sequential instances of ff and fp in P. In contrast, ff and fp are the futurized instances of $ff_s$ and $fp_s$.

Example System

Figure 3:
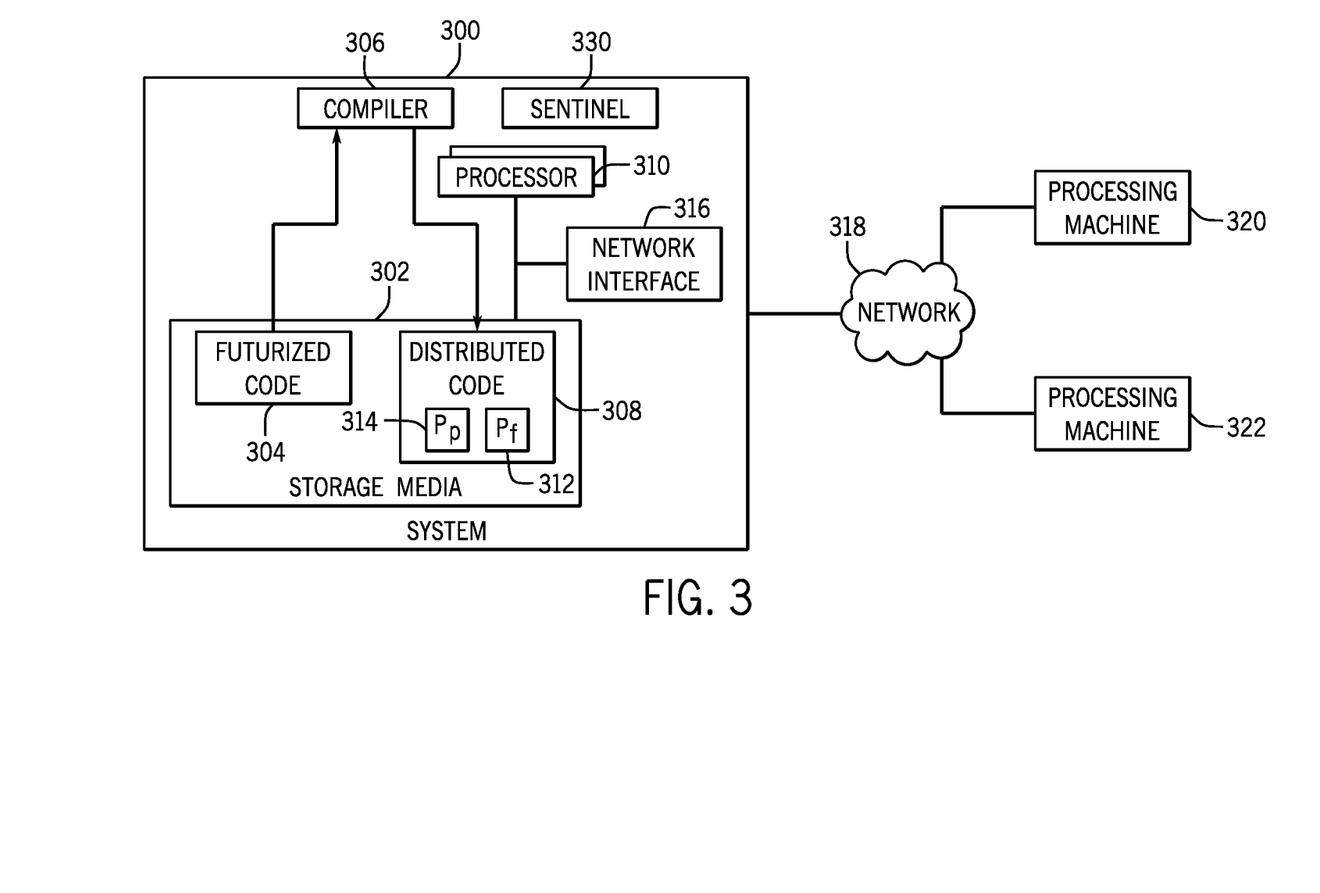
FIG. 3 is a block diagram of an example arrangement according to some implementations.

FIG. 3 is a block diagram of an example system 300 in which techniques or mechanisms can be provided. The system includes a storage media 302 that stores a futurized code 304 (e.g. P in FIG. 1 or code 204 in FIG. 2). The storage media 302 can include one or multiple storage devices. In accordance with some implementations, the futurized code 304 may be annotated with at least one future, such that at least one call of a function in the sequential code is associated with the future (this call of the function is a future call). Examples of futurized instances of sequential codes are depicted in FIGS. 1 and 2 discussed above.

The system 300 also includes a compiler 306, which can receive, as input, the futurized code 304, to produce, as output, a distributed code 308. The compiler 306 can be executable on one or multiple processors 310.

In accordance with some implementations, the distributed code 308 includes multiple programs, including a first program 312 (referred to as $P_f$) and a second program 314 (referred to as $P_p$). The distributed code 308 in FIG. 3 can thus be considered to include two programs that execute concurrently.

The following assumes that the futurized code 304 is a futurized instance of the sequential program $P_s$ of FIG. 1. In such an example, the states of $P_f$ and $P_p$ just prior to line 1' in FIG. 1 are the same as that of $P_s$ just prior to line 1. After reaching line 1', $P_f$ only performs the future (e.g. future call of the function ff in FIG. 1) and $P_p$ only performs the present (e.g. computes the function fp in the present section of the code of FIG. 1). $P_f$ and $P_p$ can then exchange their results, which brings their states to that of $P_s$ after line 3. Execution can be faster as compared to the sequential execution of $P_s$, since $P_f$ and $P_p$ each perform a partial portion of $P_s$.

The system 300 further includes a network interface 316 to allow the system 300 to communicate over a network 318 with processing machines 320 and 322. The processing machines 320 and 322 can each be configured similar to the system 300 (which is another processing machine). Although three processing machines (300, 320, 322) are depicted in FIG. 3, it is noted that in alternative examples, different numbers (less than three or greater than three) can be used in other examples.

The programs $P_f$ and $P_p$ can be executed concurrently in different processing machines. For example, the program $P_f$ can be executed on one of the machines 300, 320, and 322, while the program $P_p$ can be executed on another one of the machines 300, 320, and 322.

In some examples, the processing machine on which $P_p$ executes can be referred to as the "root node." The root node and a collection of server nodes (other processing machines) can form a distributed execution platform. In some examples, all processing machines on which programs of the distributed code 308 can execute can have the same ISA (Instruction Set Architecture), operating system, and libraries, although the processing machines can differ in aspects such as their microarchitecture or file system layout. For simplified explanation, it can be assumed that a common file system is provided across all processing machines, so that a file can be accessed from each processing machine using the same file name. However, in other examples, different file systems can be employed in the different processing machines.

At least one processing machine (e.g. 300) can include a daemon referred to as a sentinel 330. The sentinel 330 can continually listen for requests to create a distributed code from sequential code.

The future keyword manifests as a pragma. A compiler that does not support futures can still handle futurized code. Turning on support for the future pragma can be as simple as flipping a switch—e.g. by providing the following command, cc-futures foo.c.

The parallelism is transparent to a programmer or user of the sequential code. In other words, the programmer or user does not have to be concerned that the sequential code would actually be converted to a distributed code prior to execution. The fact that $P_p$ and $P_f$ of the distributed code 308 may execute on different processing machines is hidden from the programmer or user.

When an execution of P (the futurized code) is invoked on a root node, what is actually invoked is an execution of $P_p$. Initialization code in $P_p$ contacts the sentinel 330 to initiate an execution of a matching $P_f$ on another processing machine. After that, there is no more process creation. Hence, the present and future processes ($P_p$ and $P_f$) are initiated together and executed in tandem. In particular, the dynamic fork-based creation of processes is avoided.

In accordance with some implementations, each of the programs 312 and 314 ($P_f$ and $P_p$, respectively) can include a normalization function to normalize virtual addresses accessed by functions in the respective programs 312 and 314. The programs 312 and 314 can use virtual addresses. However, virtual addresses may be different on different processing machines on which the programs 312 and 314 execute, respectively. Thus, a virtual address that is sent from one program executing on a first processing machine to another program executing on a second processing machine may not be recognizable by the second processing machine, since the two processing machines may use different virtual addresses. Instead, the virtual addresses are normalized, by each normalization function, into normalized addresses, which are then exchanged between the programs 312 and 314 executing on separate processing machines. The normalized addresses can be understood on the respective separate processing machines.

In some examples, a program may have different virtual addresses on different processing machines because of ASLR (Address-Space Layout Randomization). Operating systems can utilize ASLR for security reasons. Hence, the placements of the process image parts of the same program across distinct but similar machines (e.g. same ISA, operating system, and libraries) are not guaranteed to be the same.

Details of Example Programs of Distributed Code

Figure 4:
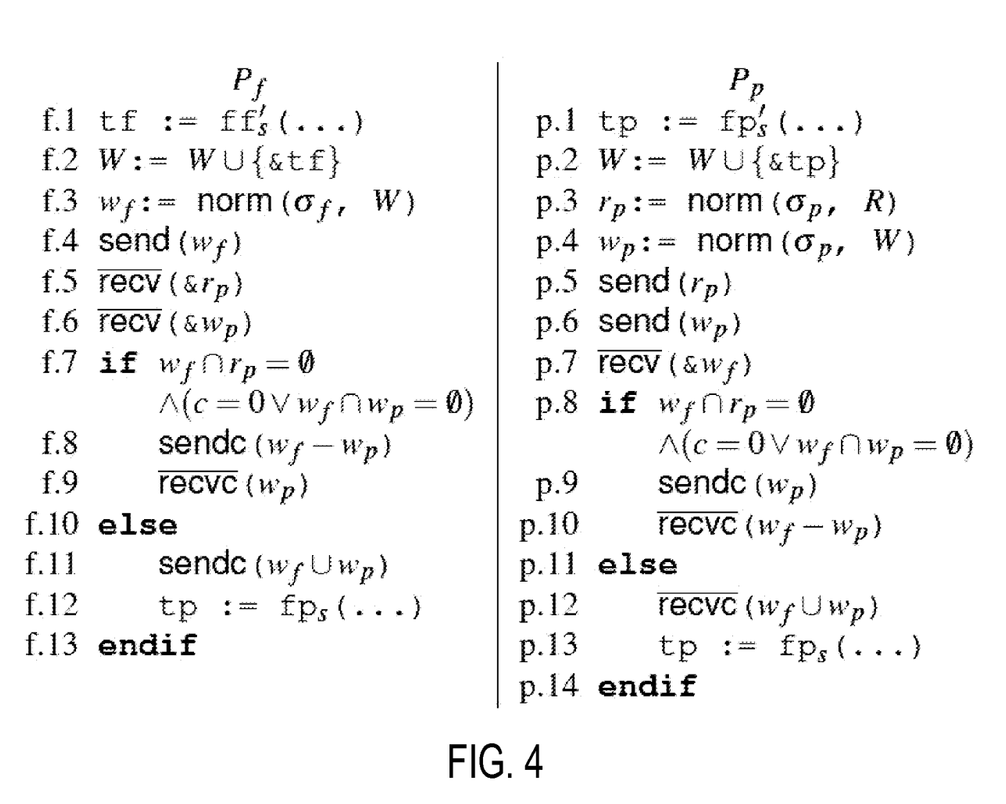
FIG. 4 illustrates programs of the distributed code generated according to some implementations.

Examples of the programs $P_f$ and $P_p$ are depicted in FIG. 4, where the programs of FIG. 4 correspond to the futurized code P of FIG. 1. In FIG. 4, the program $P_f$ includes lines f.1 to f.13 of code, whereas the program $P_p$ includes lines p.1 to p.14 of code. The code in lines f.1 to f.13 is referred to as the future harness and the code in lines p.1 to p.14 is referred to as the present harness.

Although reference is made to two different programs $P_p$ and $P_f$ in the present discussion, it is noted that the distributed code 308 generated by the compiler 306 of FIG. 3 can actually be a single distributed code, referred to as $P_{fp}$, that can be instantiated multiple times to run as multiple instances of $P_{fp}$. The multiple instances of $P_{fp}$ can include a first instance that makes up the program $P_p$, and a second instance that makes up the program $P_f$, where the first instance of $P_{fp}$ executes the code in the present section of the futurized code P, and the second instance of $P_{fp}$ executes the code in the future call of the futurized code P.

$P_{fp}$ can include a runtime-defined function called i-am-the-future( ) that can return one of two values (e.g. Boolean values) in each instantiation of $P_{fp}$. The value returned is dependent on the environment at the start of the run of $P_{fp}$.

If i-am-the-future( ) returns a first value, then $P_{fp}$ behaves as $P_f$ in a run, whereas if i-am-the-future( ) returns a second value, $P_{fp}$ behaves as $P_p$ in a run. An example of $P_{fp}$ is provided below, where lines f.1 to f.13 include the code of $P_f$ while lines p.1 to p.14 include the code of $P_p$.

```
if i-am-the-future( )
    // Lines f.1 to f.13.
else
    // Lines p.1 to p.14.
endif
```

Lines f.1 to f.13 are the code for $P_f$ corresponding to lines 1' to 3' of P in FIG. 1. Lines p.1 to p.14 are the code for $P_p$ corresponding to lines 1' to 3' of P in FIG. 1. It is assumed that there are no future calls before line 1' and after line 3' in P. Then the code prior to line 1 and subsequent to line 3 in $P_s$ is, for the most part, replicated prior to lines f.1 and p.1 and subsequent to lines f.13 and p.14, respectively.

If another future call exists before line 1' in P or after line 3' in P, then the code depicted at lines f.1 to f.13 and at lines p.1 to p.14 in FIG. 4 can be replicated prior to lines f.1 and p.1 or subsequent to lines f.13 and p.14, respectively, except with the names of the functions changed, to correspond to the different functions that may be invoked in the other future call.

Lines f.1 and p.1 in FIG. 4 contain calls to the functions ff'$_s$ and fp'$_s$. These functions ff'$_s$ and fp'$_s$ are derived from the sequential instances ff$_s$ and fp$_s$ (corresponding to functions ff and fp, respectively, in the sequential code $P_s$) by adding instrumentation to intercept, at run time, the virtual addresses in nonlocal accesses of data in ff$_s$ and fp$_s$. Ignoring this instrumentation, ff'$_s$ and ff$_s$, and fp'$_s$ and fp$_s$, have identical semantics.

Adding instrumentation to a function refers to adding instruction(s) to the function to perform specified task(s). In the case of ff'$_s$ and fp'$_s$, the instrumentation involves adding instructions to intercept virtual addresses in nonlocal accesses of data.

A memory access is nonlocal to a function if the access is a read or a write of an object (a named piece of storage in the execution environment) that resides outside that function's active stack frame. Examples of nonlocal accesses include the following: a read of a global scalar variable, a write of a global array element, and so forth. The instrumentation, added at every nonlocal access, is akin to a memory management barrier—the task of the instrumentation is to store the virtual address of the access in a read set (R) or a write set (W).

The barriers track nonlocal accesses by $P_f$ and $P_p$ at the granularity of a card, which is a division of memory intended to be finer than a page of the memory. A page of the memory can refer to a predefined segment of the memory. The runtime code (of $P_f$ and $P_p$) divides a v-bit virtual-address space into $2^{v-c}$ cards, where the card size is specified when the runtime code is built.

In some examples, a card is a contiguous sequence of $2^c$ bytes aligned on a $2^c$-byte boundary. The parameter c (c≥0) is a non-negative integer constant that is specified when the runtime code is built. To "track an access" is to include the virtual address of the read or written location in a set. A set including expressions of such locations is referred to as the "tracked set". The tracking ignores the content of the location in question—the tracking is thus address-based and not value-based. In addition, the card size, which is the granularity of tracking, is transparent to the programmer or user. The card size can be chosen when the runtime code is built—the choice of the card size does not alter program semantics, but can affect runtime performance.

At the end of line f.1 of the program $P_f$, elements in the read set R and write set W are the virtual addresses of the nonlocal objects read or written in ff$_s$. Similarly, at the end of line p.1 of the program $P_p$, elements in the corresponding read set R and write set W are the virtual addresses of the nonlocal objects read or written in fp$_s$.

Lines f.2 and p.2 add to the read and write sets associated with the programs $P_f$ and $P_r$—line f.2 adds &tf (the virtual address of the variable tf) to $P_f$'s write set W, and line p.2 adds &tp (the virtual address of the variable tp) to $P_p$'s write set W. After execution of lines f.2 and p.2, the read and write sets of virtual addresses are considered built.

Lines f.3, p.3, and p.4 each includes a call of a normalization function, norm( ), to normalize virtual addresses into a normal form. The normalization function converts elements of a write set W or read set R to respective normalized addresses. Unlike a virtual address, a normalized address for a nonlocal object is the same at both physical machines executing corresponding $P_f$ and $P_p$, if $P_f$ and $P_p$ are run with the same inputs. Line f.3 invokes norm($\sigma_f$, W) to normalize the virtual addresses in $P_f$'s write set W into normalized addresses, using a segment map $\sigma_f$. Similarly, line p.4 invokes norm($\sigma_p$, W) to normalize the virtual addresses in $P_p$'s write set W into normalized addresses, using another segment map $\sigma_p$, and line p.3 invokes norm($\sigma_p$, R) to normalize the virtual addresses in $P_p$'s read set R into normalized addresses, using a segment map $\sigma_p$.

In some implementations, the normal form of a virtual address v is a duple (sn,so), where sn and so are the s-number and s-offset of v. An s-number is an identifier that uniquely identifies a contiguous region in virtual memory called the segment. An s-offset is a displacement from a segment's base. Hence, sn is the s-number of the segment that contains v and so is the displacement of v from the base of sn. In Linux, for example, a segment corresponds to a VMA (Virtual Memory Area).

For every segment except the stack, the base is its lowest virtual address. For the stack, the base is its highest virtual address. This is because stacks grow "downward", meaning from high to low virtual address.

A segment map (e.g. $\sigma_f$ or $\sigma_p$) is an injective function that associates an s-number with the virtual address of the corresponding segment's base. The segment map is used to go between a virtual address's absolute and normal forms. The segment map can be set up by locating a program's text, data, stack, and other segments when a process of the program starts up. These segments can be located by using services of a dynamic linker/loader (e.g. ld.so in Linux), such as services provided by the dl_iterate_phdr interface. Although reference is made to Linux routines and commands in this discussion, it is noted that in other examples, routines and commands of other operating systems can be used.

In some examples, a stack segment's s-number can be 0. The s-numbers of special segments, such as vDSO, can be pre-specified positive integers. The segments that come from ELF (Executable and Linkable Format) files can be assigned s-numbers that are constructed from their file names. A goal is to ensure that segments are uniquely numbered and that a segment in $P_f$ ($P_p$) has the same s-number as its counterpart in $P_p$($P_f$).

The creation of new segments can be detected by intercepting the mmap( ) system call, which is a Linux routine to obtain memory from the system. In both $P_f$ and $P_p$, s-numbers are assigned to the created segments in the same order from the same sequence of positive integers. As long as a segment in one program ($P_f/P_p$) has a counterpart in the other program ($P_p/P_f$), and as long as segments in one program are created in the same order as the counterparts in the other program, then the segments in $P_f$ and $P_p$ can be matched and the matching segments will have the same s-numbers.

At lines f.4 to f.6 of $P_f$ and lines p.5 to p.7 of $P_p$ in FIG. 4, the programs $P_f$ and $P_p$ exchange the normalized sets $w_f$, $r_p$ and $w_p$ (containing normalized addresses produced using the respective norm( ) functions at lines f.3 , p.3 and p.4, respectively). A send(s) function can be used to send the elements of a set s of one program to the other program. For example, send($w_f$) at line f.4 sends the elements of the set $w_f$ of the program $P_f$ to the other program $P_p$. $P_p$ sends its normalized read and write sets $r_p$ and $w_p$ to $P_f$ by invoking send($r_p$) and send($w_p$) at lines p.5 and p.6, respectively.

The matching $\overline{recv}$(&r) in the other program fills the set r with the received elements, first allocating r if appropriate. For example, $\overline{recv}$(&$w_f$) at line p.7 of $P_p$ receives the elements of $w_f$ from $P_f$.

The send( ) call can be nonblocking, which allows $P_f$ and $P_p$ to immediately advance to the next step, which is to receive the sent sets: $P_f$ invokes $\overline{recv}$(&$r_p$) and $\overline{recv}$(&$w_p$), and $P_p$ invokes $\overline{recv}$(&$r_f$).

The $\overline{recv}$ call is blocking, as denoted by the horizontal bar. The call does not return until all of the content of the matching send call is received.

Once all the $\overline{recv}$ calls return on both sides (i.e. $P_f$ and $P_p$), the exchange of the normalized read and write sets is complete. Both $P_f$ and $P_p$ will then each have the sets $w_f$, $w_p$ and $r_p$. After lines f.6 and p.7, $P_f$ has in $r_p$ and $w_p$ the sets of normalized addresses read and written by $P_p$, and $P_p$ has in $w_f$ the set of normalized addresses written by $P_f$.

Instead of sending individual normalized addresses between the programs, ranges of normal addresses can be exchanged. In such implementations, a set of normalized addresses can be represented as a set of normalized ranges. A normalized range is the duple (sn,[$so_l$,$so_h$]) that denotes all of the virtual addresses within the segment sn whose s-offsets run from $so_l$ through $so_h$. By using normalized ranges, contiguous sequences of addresses can be collapsed into a compact interval. Thus, if the normalized ranges are exchanged between the programs rather than individual normalized addresses, savings can be achieved in communications bandwidth and storage space.

Note that the tracking of nonlocal accesses by the programs $P_f$ and $P_p$ is asymmetrical. In $P_p$, read and write accesses of nonlocal or potentially nonlocal data are tracked, by separate read and write sets. In $P_f$, only write accesses of nonlocal or potentially nonlocal data are tracked, by a write set.

As further depicted in FIG. 4, lines f.7 and p.8 of the programs $P_f$ and $P_p$ check for violations of sequential semantics. Each of $P_f$ and $P_p$ evaluates the violation check predicate $$VC = (w_f \cap r_p = \emptyset) \wedge (c = 0 \vee w_f \cap w_p = \emptyset).$$

If VC is true, sequential semantics is guaranteed. If VC is false, sequential semantics has been potentially violated.

The violation check predicate at lines f.7 and p.8 includes a conjunction of two sub-predicates. The first sub-predicate, ($w_f \cap r_p = \emptyset$), is false if there is a flow dependence from the future call's synchronous counterpart to the present section. In other words, there is a flow dependence if a write is performed by $ff_s$ to a memory location that is read by $fp_s$.

The second sub-predicate, (c=0 $\vee w_f \cap w_p = \emptyset$), is false if c≠0 and there is an output dependence between the synchronous counterpart and the present section, in other words both $ff_s$ and $fp_s$ write to the same memory location. When c=0 and there is no flow dependence (as checked by the first sub-predicate), the presence of an output dependence does not matter because the size of a card when c=0 is a byte, which is the smallest piece of readable or writable memory in some examples.

Note that anti-dependences do not matter. An anti-dependence exists if what is read by $ff_s$ is also written by $fp_s$. Anti-dependences do not affect sequential semantics because the address spaces of $P_f$ and $P_p$ are separate. Therefore, unlike in a shared-memory setting, anti-dependences alone do not hinder concurrent execution.

The violation check predicate at lines f.7 and p.8 evaluates to true if no sequential semantics violation is detected. In that situation, $P_f$ and $P_p$ exchange the cards written by the respective programs (lines f.8 and p.9). $P_p$ sends the cards for all of the locations written by $P_p$. However, $P_f$ sends just the cards at the addresses in $w_f$-$w_p$ because locations in $w_f \cap w_p$ should not be overwritten in $P_p$.

$P_f$ invokes sendc($w_f$-$w_p$), which sends the cards located at $w_f$-$w_p$ to $P_p$, and $P_p$ invokes sendc($w_p$), which sends the cards located at $w_p$ to $P_f$. The reason $P_f$ sends only the cards located at $w_f$-$w_p$ is because locations in $w_f \cap w_p$ should not be overwritten in $P_p$ in order to ensure sequential semantics.

A sendc(s) function (invoked at each of lines f.8 and p.9) sends the cards addressed by the elements of s to the other program. A matching $\overline{recvc}$(r) function (invoked at each of lines f.9 and p.10) in the other program receives the cards at locations addressed by the elements of r. The sendc and $\overline{\text{recvc}}$ functions take sets of normalized addresses as arguments.

The functions sendc(s) and $\overline{\text{recvc}}$(r) marshal and unmarshal the cards by scanning the normalized addresses in s and r in the same order, and by using $\sigma_f$ and $\sigma_p$ to convert the normalized addresses when reading and writing the cards. Marshaling a card can refer to converting data in the card to a format for communication over a network, while unmarshaling a card can refer to a receiver converting received data into the format understood at the receiving processing machine.

The bar above the recvc function denotes its blocking nature. The sendc function, on the other hand, is a nonblocking function. The nonblocking nature of sendc allows $P_f$ and $P_p$ to immediately advance to the next step, which is to receive the sent cards, at lines f.9 and p.10.

Once the $\overline{\text{recvc}}$ function returns on both sides, the exchange of the cards performed to ensure sequential semantics is complete. Both $P_f$ and $P_p$ will then have the same user-program state.

If a violation is detected, cards are only sent from $P_f$ to $P_p$ because $P_f$'s memory content remains valid. This is because $P_f$ logically executes only $ff_s$ by the time it reaches its violation check. The sent cards are for the locations in $w_f \cup w_p$ (as specified in line f.11). Upon receiving the cards at line p.12, $P_p$'s user-program state is set to the user-program state at line f.11 in $P_f$. This is the state between lines 1 and 2 in $P_s$. Both $P_f$ and $P_p$ then normally invoke $fp_s$, which is in the present section of $P_s$. Thus, if a violation is detected, the results of the parallel execution are discarded and the lines of the sequential code are executed again, this time sequentially in accordance with the sequential program $P_s$.

There is no special consideration for the stack because activation records in $P_f$ for and below the future call would have returned, and activation records in $P_p$ below the call containing the present section would have returned. Writes into activation records that are above would be automatically handled by the aforementioned card exchange.

Example Distributed Code Generation Process

Figure 5:
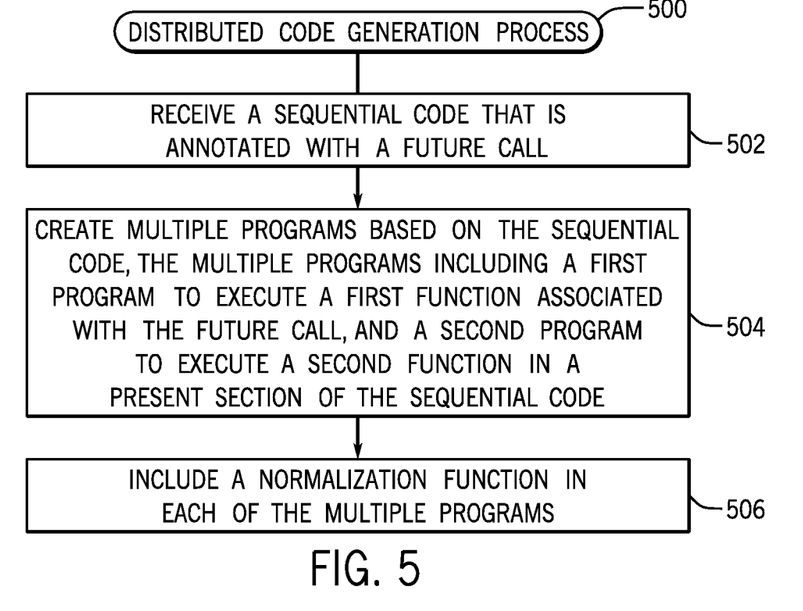
FIG. 5 is a flow diagram of a process for producing distributed code from sequential code, according to some implementations.

FIG. 5 is a flow diagram of a distributed code generation process 500 according to some implementations, which can be performed by the compiler 306 of FIG. 3. The distributed code generation process 500 receives (at 502) a sequential code that is annotated with a future call (e.g. P in FIG. 1). Next, the process 500 creates (at 504) multiple programs based on the sequential code, where the multiple programs include a first program to execute a first function associated with the future call (e.g. $P_f$), and a second program to execute a second function in a present section of the sequential code (e.g. $P_p$).

The process 500 next includes (at 506) a normalization function (e.g. norm( ) in FIG. 4) in each of the programs, where the normalization function is for normalizing virtual addresses accessed by the first and second functions.

Instrumenting Functions

Figure 6:
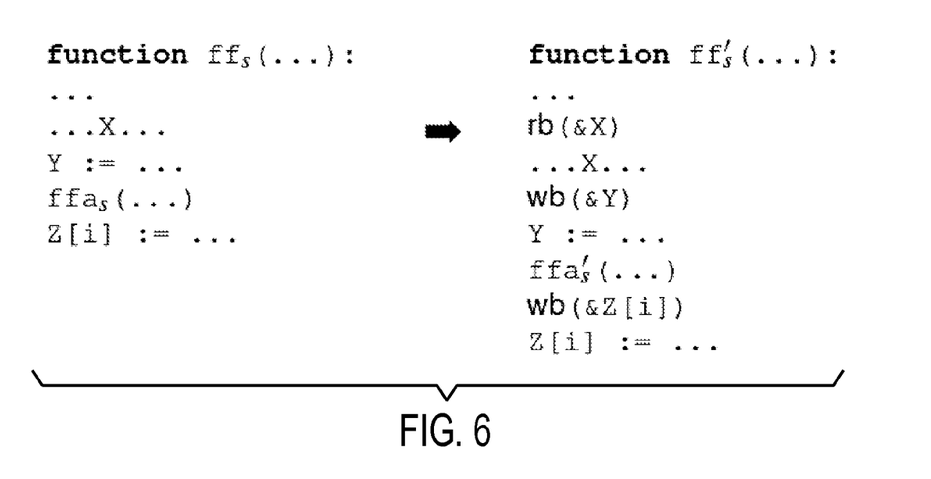
FIG. 6 illustrates code for instrumenting a function, according to some implementations.

FIG. 6 depicts an example for instrumenting a function $ff_s$ to produce $ff'_s$, which is invoked at line f.1 of the program $P_f$ in FIG. 4. A similar approach would be used to instrument a function $fp_s$ to form $fp'_s$, which is invoked at line p.1 of the program $P_p$ in FIG. 4.

A function invoked in P is either defined or undefined. The function is defined if its definition is in P. Suppose that the ff function called at line 1' in FIG. 1 is a defined function, and that all of the future or normal calls in the body of the ff function are to a single defined or undefined function ffa. This means that $ff_s$ is a defined function in $P_s$, and that all of the calls in the body of $ff_s$ are to the single defined or undefined function $ffa_s$. Then the $ff'_s$ provided in the translation of P (in particular, for the code in line f.1 in FIG. 4) can be obtained from $ff_s$ by replacing the calls to $ffa_s$ in $ff_s$ with calls to $ffa'_s$, in addition to instrumenting the nonlocal accesses in $ff_s$.

In the transformation of $ff_s$ into $ff'_s$ depicted in FIG. 6, nonlocal accesses (including accesses of X, Y, and Z[i], for example) are instrumented. When a global variable X is read in $ff_s$, a call rb(&X) is inserted just before the read of the global variable X in $ff'_s$, where rb is a read barrier. The call rb(&X) includes &X in the read set R. Similarly, when a global variable Y and a global array element Z[i] are written in $ff_s$, a call wb(&Y) and a call wb(&Z[i]) are inserted just before writes to Y and Z[i], respectively, in $ff'_s$. The call wb is a write barrier.

In general, the primed version of every function call-reachable from either $ff_s$ or $fp_s$ (i.e. reachable from either $f_s$ or $fp_s$ in the static call graph for $P_s$) may be generated by the compiler 306, by inserting the read barrier and/or write barrier as illustrated in FIG. 6.

For the undefined call-reachable functions, however, the primed versions are to be provided in a library. The library writer can produce the primed versions in the same way the compiler produces $ff'_s$ from a defined $ff_s$.

Flattened Futures

A translation scheme according to some implementations for generating distributed code from sequential code does not result in nesting of futures. In other words, inner future calls execute as normal calls. The elision of the inner future calls provides flattened futures. For example, if lines 1' to 3' of FIG. 1 form the body of the first function executed by P, then line 1' is the first future call and all future calls in functions transitively called from lines 1' and 2' will execute as normal calls.

The execution of inner future calls as normal calls is valid because futures according to some implementations have sequential semantics. In any complete call chain, all future calls except the outermost future call execute as normal calls. The outermost future call also executes as a normal call if the outermost future call occurs below a present section in the complete call chain.

The elision of inner future calls (i.e. to treat inner future calls as normal calls) affords another advantage to the translation scheme—it allows nonlocal accesses to be tracked using a single read set and a single write set. For instance, if the invocation at line 1' in FIG. 1 is the outermost future call, then because inner future calls are treated as normal calls, the primed functions transitively called from $ff_s$ can add their nonlocal access addresses to the same R and W sets used by $ff'_s$. Hence, the R and W sets can be set up before the outermost future call and present section initiate (i.e. before lines f.1 and p.1 in FIG. 4), and can be torn down after the outermost future call and present section finish (i.e. after lines f.13 and p.14 in FIG. 4).

Multi-Version Translation

In some implementations, a translation scheme to turn P into a distributed code may involve the compiler 306 having to generate up to three versions of a defined function called in the sequential code P. The compiler 306 may also have to obtain (from a library) up to two versions of an undefined function.

For example, suppose that lines 1' to 3' in FIG. 1 form the body of an example defined function foo. The first generated version of foo corresponds to the code in FIG. 4. If foo is invoked in the present section of another defined function bar, then $foo_s$ (i.e. the sequential instance of foo) has to be generated because $foo_s$ will then be called at lines f.12 and p.13 in bar's translation. Finally, if foo is call-reachable from a future call, then $foo'_s$ would also have to be generated, for use at line f.1 of FIG. 4, for example.

If the ff function called at line 1' in FIG. 1 is undefined, then FIG. 4 shows that only $ff_s$ has to be provided in the translation (for the code at line f.1). And if the fp function called at line 2' is undefined, then FIG. 4 shows that only $fp'_s$ and $fp_s$ have to be provided in the translation (for the code at lines p.1, f.12 and p.13 in FIG. 4).

As noted above, one of the versions of a defined function in the translation scheme discussed above is $foo'_s$. This is obtained by replacing all calls to a function $ffa_s$ in the body of $foo_s$ (i.e. the sequential instance of foo), in addition to instrumenting the nonlocal accesses in $foo_s$.

The function $foo_s$ is useable at lines f.1 and p.1 in FIG. 4. However, at line f.1, a more specialized version can be used, one in which none of the reads are tracked. Such a specialized version is referred to as $foo''_s$. The function $foo''_s$ can be generated from foo by replacing all calls to $faa_s$ in the body of $foo_s$ by $ffa''_s$, and by only instrumenting the nonlocal writes in $foo_s$. In other words, nonlocal reads do not have to be instrumented, which can reduce processing time of the distributed code. Thus, up to four versions of a defined function may have to be used in an optimized translation scheme.

If foo were undefined, then up to three versions may have to be provided in the optimized translation scheme: $foo''_s$, $foo'_s$, and $foo_s$.

Irrevocable Functions

Irrevocable functions are handled differently than revocable functions in the process of translating a sequential code to distributed code. A function is irrevocable if its effects may not be undoable. Some examples of irrevocable functions are those that perform input/output operations (such as a function to perform printing), raise signals, and perform a nonlocal transfer of control.

If either of the functions invoked at lines 1' and 2' in FIG. 1 is irrevocable, the compiler 306 falls back to generating normal code for the code section from line 1' to line 3'. Once again, this is valid because futures have sequential semantics.

An undefined function, e.g. baz, should be marked irrevocable unless there is information to the contrary. Information to the contrary can come in the form of a summary that states that $baz_s$ is revocable. Such a summary may accompany $baz_s$'s library definition. Whether the undefined function $baz_s$ is revocable may also be determinable from a specification if $baz_s$ is part of a standardized API (Application Programming Interface)—for instance, if $baz_s$ is a system call specified by POSIX or belongs to the standard C library.

A defined function should be conservatively marked irrevocable if any statement in its body is irrevocable. A statement is either a call or a noncall. A call statement is irrevocable only if the called function is irrevocable. A noncall statement is usually revocable except in certain language-specific cases. Examples of language-specific cases in C are inscrutable asm (assembler) statements and statements that access volatile objects. Hence, a defined function's revocability can be automatically established by the compiler 306 by examining its noncall statements, considering the summaries of its undefined callees, and recursively establishing the revocability of its defined callees.

More aggressive solutions may be possible in particular cases. For instance, if the files output by the future call and present section can be sandboxed, and if the violation check is extended to reflect flow and output dependences on file content, then concurrency may be achievable even in the presence of file output operations.

Virtual and Normalized Addresses

The following provides an explanation of virtual and normalized addresses according to some examples. It is assumed that the compiler 306 writes code into files that conform to ELF (Executable and Linking Format). An ELF file is generally one of three types: a relocatable object, an executable object, and a shared object. A relocatable file is intended for further linking with other ELF files and eventually leads to a shared object or executable file. The following discussion refers to executable and shared object files.

A program's process image is a collection of virtual memory segments that are constructed from the so-called sections that comprise its executable and shared object files. Segments can hold specialized information. For example, a text segment holds the program's code and read-only data, a data segment holds the program's statically allocated writable data and heap, and a stack segment holds the program's run-time stack.

Figure 7:
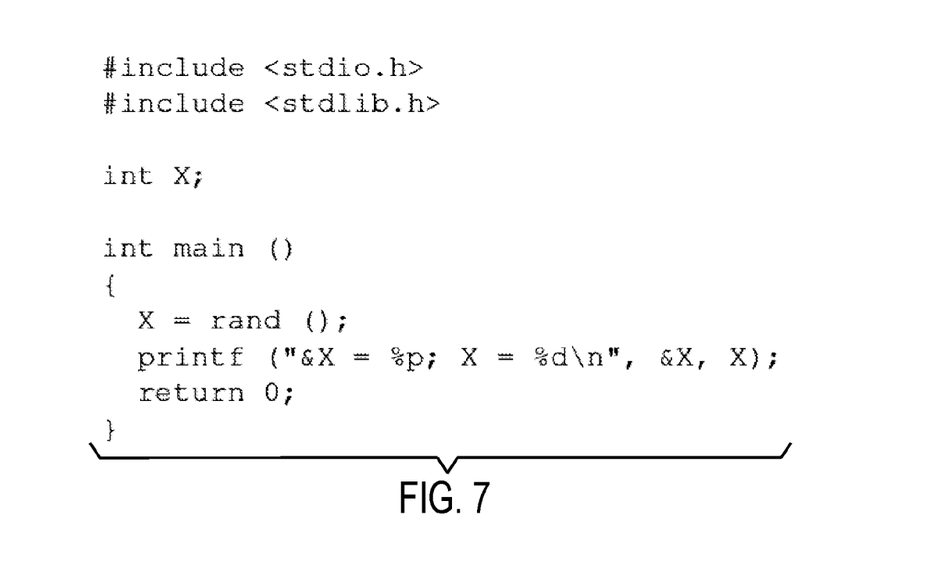
FIG. 7 illustrates an example code to show that a static data item in a program's executable file will have the same virtual address with each run.

Segments occupy disjoint intervals in the process's virtual-address space. Those constructed from the sections of an executable file are located at fixed virtual addresses. This means that a static data item in a program's executable file will have the same virtual address in every run of the program. The foregoing point is demonstrated using an example C program shown in FIG. 7. The value of &X will be the same in every run of the program. If the example C program of FIG. 7 were compiled into an ELF executable file, e.g. a.out, then readelf −s a.out | awk '/X/ {print $2}' gives the value that &X will have on every run. Consequently, &X can be determined without running the program.

Segments constructed from the sections of a shared object, however, can be located at different virtual addresses in every run. But the relative positions of the static data within the segments stay fixed.

The logical base of every segment except the stack is at the segment's lowest virtual address. Thus, on every run, all static data will have the same displacements from the logical bases of their containing segments, irrespective of whether the segments come from an executable or a shared object file.

The logical base of the stack segment is at its highest virtual address because stacks grow downward. Therefore, if the complete call chain is the same whenever a function is invoked for the nth time, then a stack variable allocated in the nth invocation of that function will have the same displacement from the stack segment's logical base.

Statically Eliminating a Violation Check

In implementations discussed above, it is assumed that the programs of the distributed code produced from the sequential code includes instructions pertaining to performing a check for violation of sequential semantics (e.g. at lines f.7 and p.8 in FIG. 4). In some cases, the violation check can be omitted in the runtime code (e.g. $P_f$ and $P_p$). Instead, in such cases, the violation check can be performed statically at compile time, rather than at run time.

Compilers statically model the possible definitions and uses at a call site cs of a function by MOD-REF sets. MOD(cs) is a set of lvalue expressions of locations that may be defined on executing cs. REF(cs) is a set of lvalue expressions of locations that may be used on executing cs.

Two lvalues alias if they name overlapping objects. Let the predicate X~Y be true if there exists an x∈X and a y∈Y, where X and Y are lvalue sets, such that x and y may alias. The static violation check performed at compile time would be as follows:

$$SVC = (\neg (MOD(s_1) \sim REF(s_2))) \land (c = 0 \lor (\neg MOD(s_1) \sim MOD(s_2)))$$

The static violation check SVC is evaluated at compile time, for $P_s$ in FIG. 1, for example. If SVC evaluates to true, the compiler replaces the code at lines f.7 to f.13 with the code at lines f.8 to f.9 in FIG. 4, and replaces the code at lines p.8 to p.14 with the code at lines p.9 to p.10.

Optimized Violation Check

The following describes how a violation check can be enhanced over the violation check depicted in FIG. 4. It can be shown that the violation check predicate can be rewritten as:

$$VC^* = (w_f \cap r^*_p = \emptyset) \land (w_f \cap w_p = \emptyset),$$

where $r^*_p = r_p - w_p$, is equivalent to the violation check used in FIG. 4 when c>0. Hence when c>0, rather than tracking all of the read locations in the read set R, as performed in FIG. 4, the tracking of read locations that are also written (either before or after) can be avoided. Read locations that are also written can include much fewer elements than the full read set.

Eliminating Covered Read Barriers

A read barrier call (e.g. rb in FIG. 6) on a virtual address is covered if its execution implies that a write barrier call (e.g. wb in FIG. 6) on the same virtual address was or will be executed. According to the optimized violation check predicate, VC*, discussed above, the compiler 306 can eliminate covered read barrier calls when c>0.

The following describes a procedure for determining a subset of covered read barrier calls. The input to the procedure is C, a CFG (control-flow graph) that is in the SSA (Static Single Assignment) form. Suppose that the statement rbcs in a basic block bb is the read barrier call rb(a), where the lvalue a is the virtual address of a location that is read. If the basic block bb also contains wb(a), then rbcs is a covered read barrier call.

It is assumed that there is no wb(a) in the basic block bb. Then all basic blocks in C that contain wb(a) are deleted, to obtain the CFG C'. If the basic block bb is either unreachable from the entry basic block or does not reach the exit basic block in C', then rbcs is a covered read barrier call. The compiler can safely remove statements that are covered read barrier calls.

In some examples, the foregoing technique of eliminating read barriers is able to detect read barrier elimination opportunities that may not be detectable by dominance or post-dominance alone.

Hoisting Barriers Out of Loops

Suppose that a statement bcs is a read-barrier call rb(a) or a write-barrier call wb(a). If the variable a is invariant with respect to its innermost containing loop L, then bcs can be hoisted out of the loop L.

On detecting a barrier hoisting opportunity in the loop L, the compiler 306 peels out the first iteration of the loop L by using a loop-peeling transformation. Let L' be the resulting loop. All barrier calls whose innermost loop is L' and whose arguments are invariant with respect to L' can be safely removed by the compiler 306.

Hoisting sendc Calls

Figure 8:
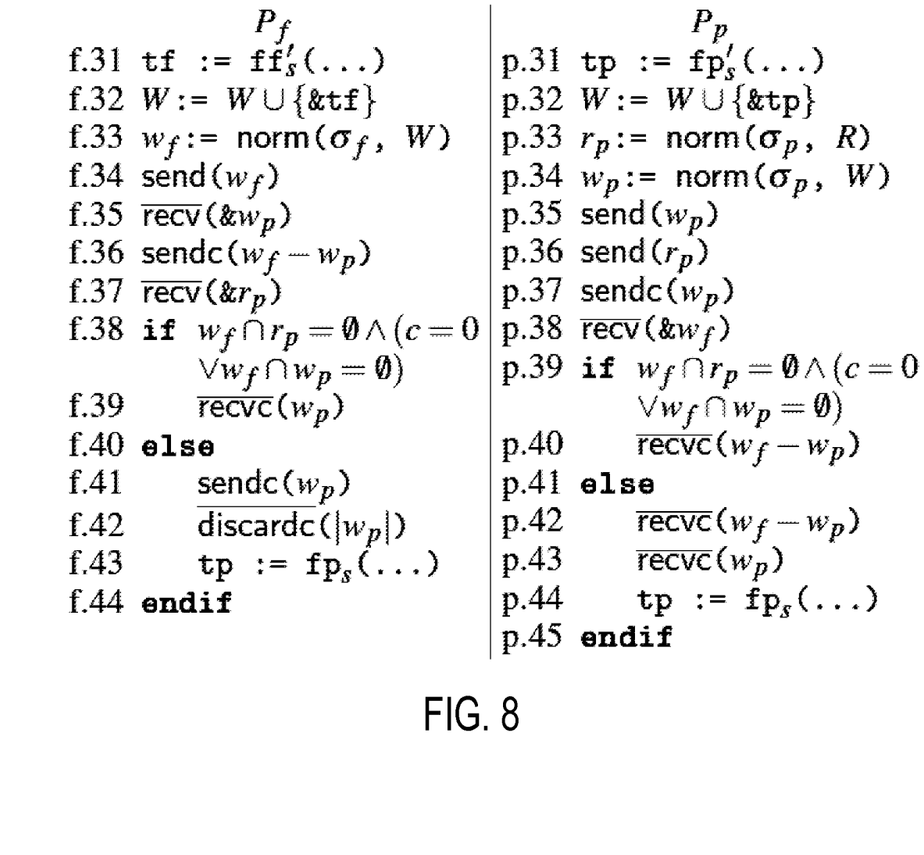
FIGS. 8 and 9 illustrate programs of the distributed code, according to further implementations.

Since sendc is a nonblocking call, it can be moved to points earlier than those shown in FIG. 4. This allows the runtime to overlap the execution of the sendc call with the execution of the violation check and other send and receive operations. FIG. 8 shows a result of applying hoisting of sendc calls to the code in FIG. 4.

FIG. 8 shows an example in which the sendc($w_f$–$w_p$) call at line f.8 of FIG. 4 has been moved up, and in which the sendc($w_p$) call at line p.9 in FIG. 4 has been moved up. In each case, the sendc( ) call is moved out of the code that is performed if the sequential semantics check evaluates to true (e.g. f.8 to f.9 and p.9 to p.10 in FIG. 4).

The $\overline{discardc}(|w_p|)$ call at line f.42 blocks until n cards have been received from $P_p$, where n is the number of elements in $w_p$. These cards are simply discarded on receipt—they therefore do not affect the user-program state.

Replacing recv and recvc with Nonblocking Versions

In FIG. 4, the $\overline{recv}$ and $\overline{recvc}$ calls for receiving normalized addresses and corresponding cards, respectively, are blocking calls.

Let recv and recvc be the nonblocking versions of $\overline{recv}$ and $\overline{recvc}$. The recv and recvc calls can be moved earlier in each of the programs $P_f$ and $P_p$ as compared to points where the blocking calls $\overline{recv}$ and $\overline{recvc}$ would have been placed (as can be easily determined based on comparing FIGS. 4 and 9). By using recv and recvc, the executions of $ff_s(\ldots)$ and $fp'_s(\ldots)$ in the programs $P_f$ and $P_p$ can be overlapped with the receive operations specified by the recv and recvc calls.

Figure 9:
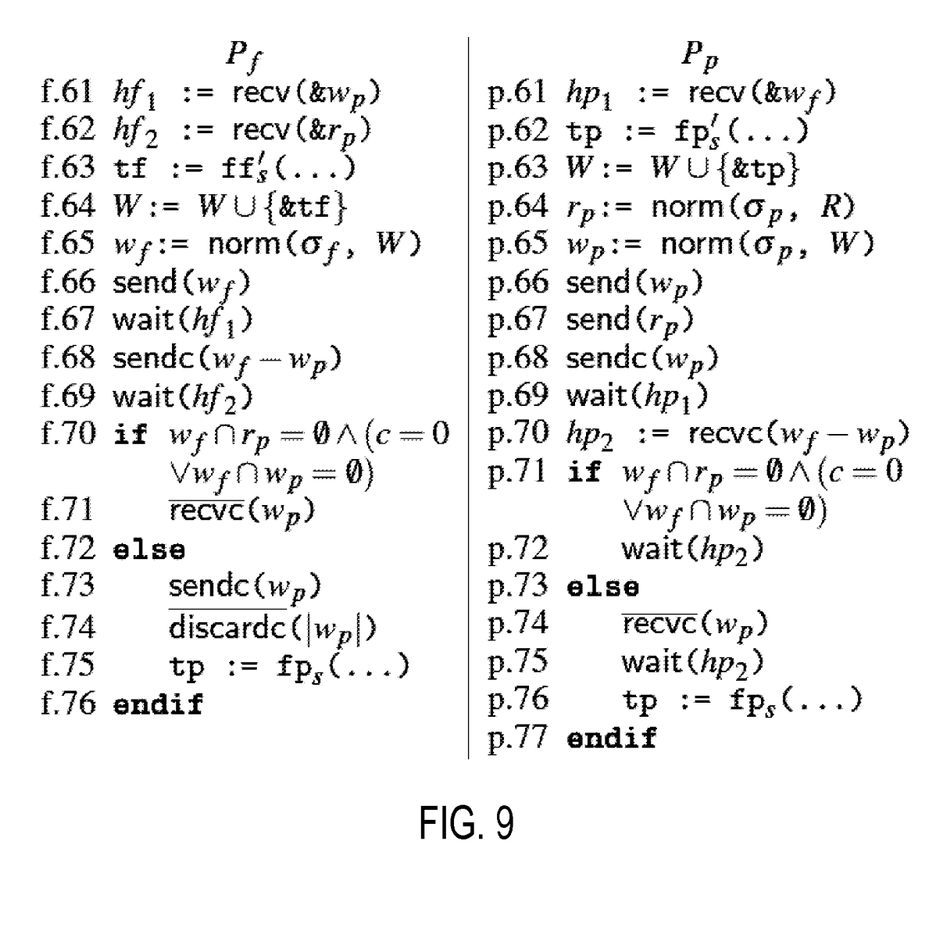

As shown at lines f.61, f.62, p.61 and p.70, in FIG. 9, the recv and recvc calls return handles. A wait call on a handle blocks until the corresponding receive operation completes. Thus, after lines f.67, f.69, p.69, p.72 and p.75 in FIG. 9, the receive operations at lines f.61, f.62, p.61, p.70 and p.70 would have respectively completed.

System Architecture

Machine-readable instructions described above (including the compiler 306, futurized code 304, and the distributed code 308) can be loaded for execution on a processor or processors. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of providing a distributed implementation of sequential code that includes a future, comprising:
    creating, by a system having a processor, a plurality of programs based on the sequential code that includes at least one call of a first function associated with the future, wherein at least a first of the plurality of programs is to execute the first function associated with the future, and at least a second of the plurality of programs is to execute a second function in a present section of the sequential code;
    instrumenting the first function to intercept virtual addresses accessed during run time of the first function, wherein the instrumented first function is included in the first program;
    instrumenting the second function to intercept virtual addresses accessed during run time of the second function, wherein the instrumented second function is included in the second program;
    including, by the system, a normalization function in each of the plurality of programs to normalize virtual addresses accessed by the first and second functions;
    including code in the first program to send, to the second program, normalized addresses produced using the normalization function in the first program; and
    including code in the second program to send, to the first program, normalized addresses produced using the normalization function in the second program.

2. The method of claim 1, wherein the present section includes a portion of the sequential code from just after assignment of the future to just before a claim point of the future.

3. The method of claim 1, wherein instrumenting each of the first and second functions comprises instrumenting each of the first and second functions to track accesses at a granularity of a card, wherein a virtual address space is divided into a plurality of cards, and wherein a size of each card is based on a configurable parameter.

4. The method of claim 1, wherein the instrumented first and second functions are to store the intercepted virtual addresses for read accesses in read sets and the intercepted virtual addresses for write accesses in write sets.

5. The method of claim 1, wherein sending at least a portion of the normalized addresses produced using the normalization function in the first program comprises sending a range that identifies a contiguous sequence of the normalized addresses in the portion.

6. The method of claim 1, further comprising:
    including code in each of the first and second programs to check for violation of sequential semantics.

7. The method of claim 1, further comprising:
    performing a check for violation of sequential semantics in the plurality of programs at compile time.

8. The method of claim 1, wherein normalizing the virtual addresses uses a segment map that associates a virtual address with an identifier that uniquely identifies a segment in virtual memory.

9. A method of providing a distributed implementation of sequential code that includes a future, comprising:
    creating, by a system having a processor, a plurality of programs based on the sequential code that includes at least one call of a first function associated with the future, wherein at least a first of the plurality of programs is to execute the first function associated with the future, and at least a second of the plurality of programs is to execute a second function in a present section of the sequential code;
    including, by the system, a normalization function in each of the plurality of programs to normalize virtual addresses accessed by the first and second functions;
    in each of the plurality of programs, inserting a command to send data in a segment of memory before code that is performed if a sequential semantics check evaluates to true; and
    in each of the plurality of programs, converting a blocking call to a non-blocking call, and inserting the non-blocking call at a point in the respective program prior to a point where the blocking call would have been provided.

10. An article comprising at least one non-transitory machine-readable storage medium storing instructions that upon execution cause a system to:
    create, by a compiler, a distributed code including a plurality of programs based on a sequential code that includes at least one call of a first function associated with a future, wherein at least a first of the plurality of programs is to execute the first function associated with the future, and at least a second of the plurality of programs is to execute a second function in a present section of the sequential code;
    including, by the compiler, a normalization function in each of the plurality of programs to normalize virtual addresses accessed by the first and second functions;
    instrument the first function to intercept virtual addresses accessed during run time of the first function, wherein the instrumented first function is included in the first program; and
    instrument the second function to intercept virtual addresses accessed during run time of the second function, wherein the instrumented second function is included in the second program.

11. The article of claim 10, wherein the instructions upon execution cause the system to further:
    generate, by the compiler, multiple versions of a function of the compiler code for use in the distributed code.

12. The article of claim 11, wherein one of the multiple versions is generated by instrumenting nonlocal reads and writes in the function by adding read and write barriers, respectively.

13. The article of claim 11, wherein one of the multiple versions is generated by instrumenting nonlocal writes in the function by adding write barriers, without instrumenting nonlocal reads.

14. The article of claim 10, wherein the instructions upon execution cause the system to further:
    include code in each of the first and second programs to check for violation of sequential semantics; and
    include code in each of the first and second programs to track reads of memory locations that are not also written.

15. The article of claim 10, wherein the instructions upon execution cause the system to further:
    eliminate covered read barriers when instrumenting a function for the plurality of programs.

16. The article of claim 10, wherein the instructions upon execution cause the system to further:
    hoist a read barrier or write barrier out of a loop.

* * * * *